United States Patent [19]

Tetard

[11] 4,197,758
[45] Apr. 15, 1980

[54] TRANSMISSION BY GEARS WITH DIVIDED TRAINS

[75] Inventor: Jean-Claude Tetard, Erstein, France

[73] Assignee: Compagnie Industrielle des Telecommunications, Paris, France

[21] Appl. No.: 913,928

[22] Filed: Jun. 8, 1978

[30] Foreign Application Priority Data

Jun. 17, 1977 [FR] France ............... 77 18647

[51] Int. Cl.² .................................. F16H 57/00
[52] U.S. Cl. ....................... 74/410; 74/411
[58] Field of Search ........... 74/410, 411, 412 R, 74/413, 414, 415; 64/14, 11 R, 27 R

[56] References Cited
U.S. PATENT DOCUMENTS

| 1,536,092 | 5/1925 | Guy et al. | 74/410 |
| 3,244,020 | 4/1966 | Breuer | 74/411 |
| 3,499,343 | 3/1970 | Burkhardt et al. | 74/410 X |

FOREIGN PATENT DOCUMENTS 814724  6/1959  United Kingdom ............... 74/411

Primary Examiner—Peter P. Nerbun
Attorney, Agent, or Firm—Sughrue, Rothwell, Mion, Zinn and Macpeak

[57] ABSTRACT

A transmission by gears with divided gear trains which comprises for N gear trains 2N gears connected in pairs by torsion shafts which distribute evenly the power to be transmitted, due to a predetermined rigidity.

In the case of two gear trains, the rigidity of the torsion shafts is in the inverse proportion of the squares of their rotation speed.

7 Claims, 5 Drawing Figures

4,197,758

TRANSMISSION BY GEARS WITH DIVIDED TRAINS

FIELD OF THE INVENTION

The present invention relates to the transmission of movement which it is impossible or difficult to transmit by conventional gearing, by means of gearing having divided gear trains.

BACKGROUND OF THE INVENTION

When it is required to transmit a movement from one shaft to another shaft parallel to the first, it is known that generally, gearing is used. When the rotation speed of at least one of the two shafts is very high, the peripheral speed of its gear wheel is reduced by reducing its diameter, but it is then necessary to increase its length to keep its volume constant and consequently to keep its mechanical strength constant. Problems of the loading of the teeth against each other then arise which limit the use of conventional types of gearing.

Likewise, when the power to be transmitted from one shaft to another is high, from about 80 to 100 megawatts, no conventional type of gearing can give a satisfactory result because of the excessive mechanical stresses. Hence, in accordance with the known art, this has led to solutions which comprise a plurality of gear trains. As it is known to manufacture gear wheels which can transmit for example up to 40 or 50 megawatts, circumstances have led to coupling gear trains together in parallel. Divided gear trains have thus been constituted which each bear a load equal to or less than 50 MW and it has become possible to transmit high powers by distributing them among several gear trains each of which is subjected to a power of less than or equal to 50 MW.

It is known at present to manufacture gear transmissions with divided gear trains which have six gears to divide the power to be transmitted by each gear by a factor of two.

If the power P to be transmitted is very high, it is known at present to manufacture a gear transmission with 2 N+2 gears which transmits a power of P/N per gear train. Since each gear wheel requires two bearings, for reasons which will be explained hereinbelow, it is necessary to use 2 N+2 gear wheels and 4 N+4 bearings.

Such an installation occupies a great volume and requires a great number of components. Thus, a known installation which divides the power transmitted by 2, (N=2) requires six gear wheels and twelve bearings. Preferred embodiments of the present invention reduce the number of gear wheels used as well as the number of bearings.

SUMMARY OF THE INVENTION

The invention provides a gear transmission for transmitting power from an inlet drive shaft to an outlet driven shaft, the transmission comprising 2 N gear wheels meshing in N gear trains each of which is arranged to transmit one Nth of the power to be transmitted, shaft coupling between each adjacent pair of gear wheels on the same shaft being via one of 2 N−2 torsion shafts.

Where the power to be transmitted is not more than about 90 MW, the gear transmission according to the invention can comprise four gear wheels meshing in two gear trains and connected together in pairs by two torsion shafts.

Embodiments of the invention are described by way of example with reference to the accompanying drawings.

DESCRIPTION OF THE PRIOR ART AND PREFERRED EMBODIMENTS OF THE INVENTION

Figure 1:
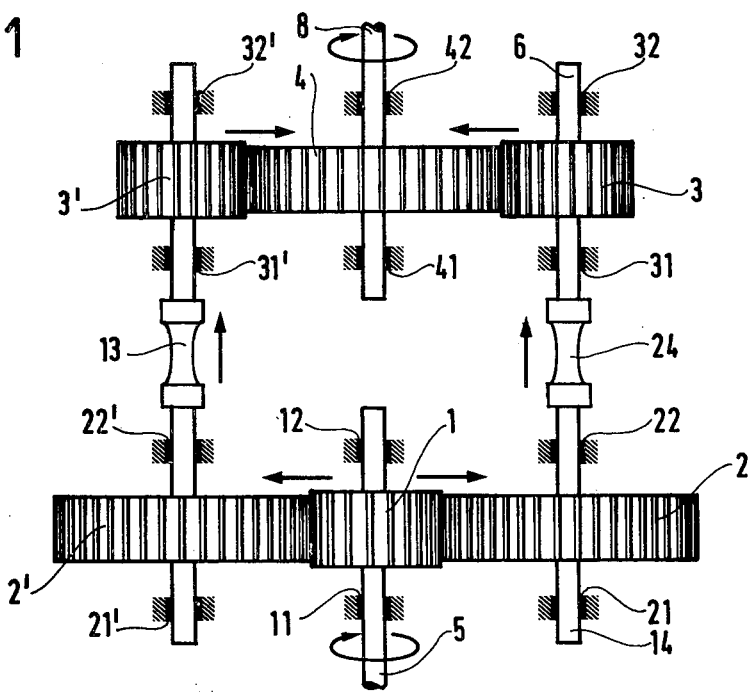
FIG. 1 is a plan view which shows schematically a gear transmission with conventional divided gear trains in which the power to be transmitted is divided by two.

FIG. 1 shows an installation used in accordance with the known art. If it is required to transmit a power of 80 MW supplied on a drive shaft 5, two gears wheels 2 and 2' are associated with a gear wheel on either side thereof and meshing therewith. The gear wheels 2 and 2' share between them the power to be transmitted to gear wheels 3 and 3' by means of shafts 13 and 24. The gear wheels 3 and 3' then transmit the power to a gear wheel 4 installed on a driven shaft 8. The arrows drawn in the figure show the direction of power transmission.

To obtain an equal distribution of the power on the two gear trains despite any defects in the teeth, it is essential for the two gear wheels 3 and 3' to exert the same action at the same time on the teeth of the gear wheel 4, which can be achieved by interposing torsion shafts of the same rigidity between the gear wheels 2 and 3, and 2' and 3' respectively. Since the torsion shafts are liable to bend, it is essential to dispose two bearings on the shaft in the vicinity of the torsion shafts. The result of all this is that the conventional arrangement will actually comprise six gear wheels and twelve bearings 11 to 42.

Figure 2:
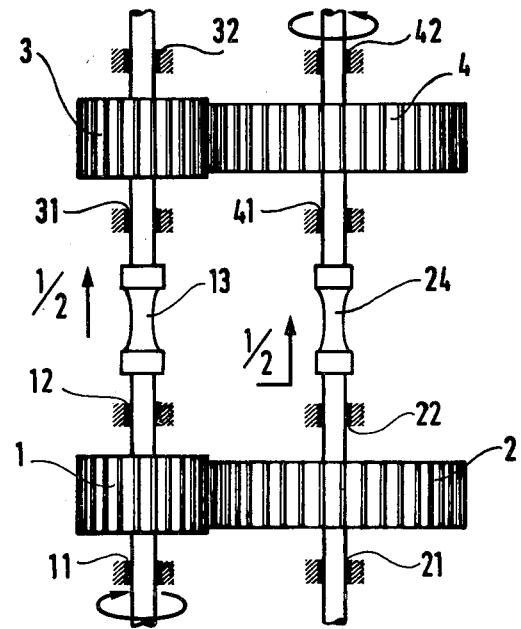
FIG. 2 is a plan view which shows schematically a transmission in accordance with the invention which divides the power to be transmitted by two.

FIG. 2 shows the same distribution of power, this time in accordance with the invention. The components in FIG. 2 bear the same references as in FIG. 1. To share the power in accordance with the invention, the torsion shafts 24 and 13 must be suitably dimensioned.

Indeed, if the shaft 13 were entirely rigid, all the power would pass through this shaft and the gear train 2, 3 would be useless.

If, on the contrary, the shaft 24 were rigid, all the power would pass through the gear train 2, 3 and shaft 13 would be useless; there is therefore an intermediate rigidity for each of the two shafts which allows the power to be shared in a given proportion, in this case, ½.

For the applied power to be distributed evenly along the two branches, the torsion of the shafts 13 and 24 must cause equal movements of the gear teeth which mesh with the output gearing 4.

If K is the step down ratio of the two gears, the shafts 13 must twist through an angle which is K times greater than that of the shaft 24 when the torque K is half as great, since the staggering of the teeth of (3) must be equal to the staggering of the teeth of (4). Hence, the resilience of the torsion shafts must be in the ratio of the squares of the rotation speeds of the gears.

The torsion shafts can be disposed beyond the teeth, as shown in the diagram in FIG. 2. But to save space in the installation, it can be very advantageous to use a disposition in which the torsion shafts are placed inside the gear wheels and are connected thereto by hollow shafts.

Figure 3:
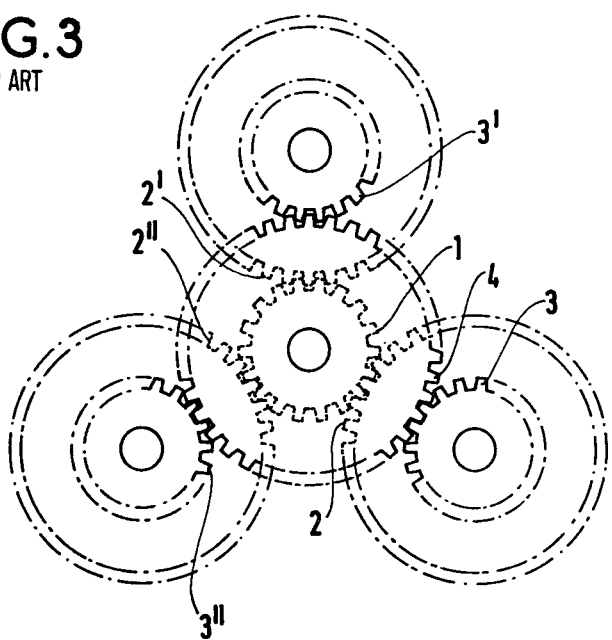
FIG. 3 is an end view which shows schematically a conventional transmission which divides the power to be transmitted by three.

FIG. 3 corresponds to the conventional case of star step down gearing where the drive shaft bears a gear wheel 1 whose rotation makes the three gear wheels 2, 2' and 2" rotate; these gear wheels are connected by torsion shafts to respective gear wheels 3, 3' and 3" which in their turn drive the gear wheel 4; here N=3. The power received on the drive shaft of the gear wheel 1 is divided into three equal powers on the three torsion shafts and on the gear wheels 3, 3' and 3" which restore the total power to the driven shaft of the gear wheel 4. There are eight gears wheels and sixteen bearings.

Figure 4:
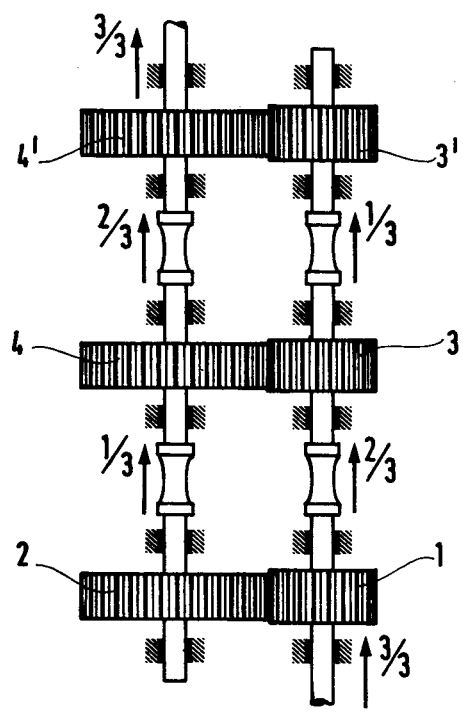
FIG. 4 is a plan view which shows schematically the solution to the divide-by-three problem in accordance with the invention.

This case will be treated in accordance with the invention with reference to a gear train of six gear wheels and twelve bearings in accordance with the diagram in FIG. 4.

The torsion shafts are arranged so as to allow one third of the power to pass from the gear wheel 1 to the gear wheel 2; and one third of the power to pass from the gear wheel 3 to the gear wheel 4; and one third of the power to pass from the gear wheel 3 ' to the gear wheel 4'.

Figure 5:
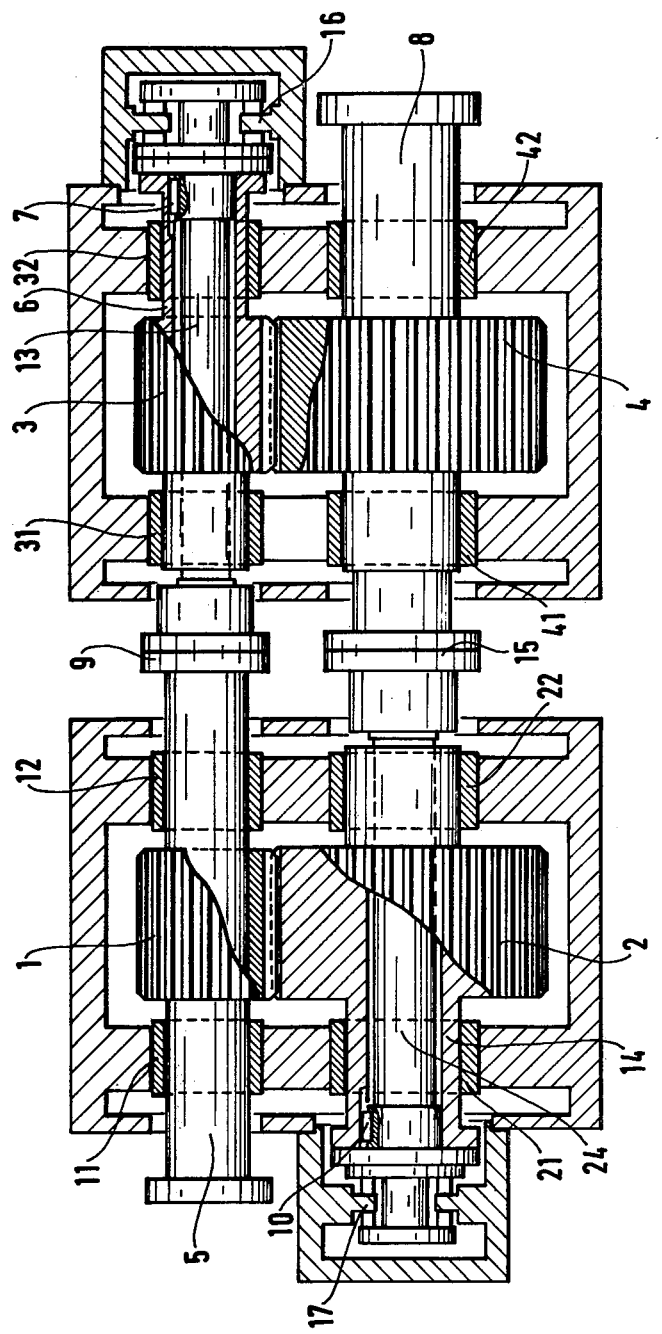
FIG. 5 is a cross-section through a practical divide-by-two embodiment of the invention.

A realization of this is described with reference to FIG. 5. There is a gear wheel 1 on the input shaft 5; this gear wheel 1 drives the gear wheel 2 installed on a hollow shaft 14 which transmits its rotary movement to the torsion shaft 24 which is connected to the output shaft 8 by a coupling plate 15. The shaft 5 also drives the torsion shaft 13 by means of the coupling plate 9. This shaft is in its turn keyed at 7 to a hollow shaft 6 which bears the gear wheel 3 which drives the gear wheel 4. Hence, the shaft 8 is driven firstly by the gear wheel 4 and secondly by the hollow shaft 24 which is coupled to the end of the shaft 8.

The distribution of the power which drives the shaft 8 depends on the rigidity of the torsion shafts 13 and 24. Indeed, under the effect of the torque applied to the input shaft 5, the torsion shaft 13 will undergo a torsional deformation which causes the gear wheel 3 to rotate. This rotation will bring the teeth of the gear wheel 3 into contact with the teeth of the gear wheel 4.

Further, the drive torque applied to the input shaft 5 will make the gear wheel 1 rotate; the teeth of the gear wheel 1 will exert pressure on the gear wheel 2 whose rotation will cause the torsion shaft 24 to twist.

For the torque transmitted to the shaft 8 by the coupling plate 15 to be equal to the torque applied by the teeth of the gear 4, it is necessary and sufficient that the torsion angles of the shafts 13 and 24 be proportional to the shaft rotation speed, i.e. that the rigidity of these shafts be proportional to the square of their speed.

It is therefore seen that there is a simple means which makes it possible to distribute the load between two shaft trains evenly by using only four gear wheels 1, 2, 3 and 4 and eight bearings: 11 and 12 for the shaft 5, 31 and 32 for the hollow shaft 6, and 21 and 22 for the hollow shaft 14 and the bearings 41 and 42 for the shaft 8.

It is noted that the embodiment comprises two torsion shafts 13 and 24 inserted inside hollow shafts 6 and 14: it is thus possible to reduce the volume of the device very greatly.

It can also be noted that two stops-a stop 16 on the shaft 6 and a stop 17 on the shaft 14—are sufficient to stabilize the installation. Indeed, the gears wheel 1 and 3 are cut with opposite angles of helical inclination so as to cancel axial thrust. The same applies to the gear wheels 2 and 4. It should also be observed that the resilience imparted to the device by the use of torsion shafts makes it possible to tolerate a slight geometrical defect in the formation of the teeth. This defect will cause only low differences in overload in relation to the halving of the load on the two gear wheels 2 and 3.

The example which has just been described corresponds to a device which transmits a power of 90 MW at 6400 rpm.

Generally, full application is found for the present invention on all high-power machines, both when the rotation speed is high and when the applied torque is very great. In particular, the present device is extremely advantageous at the output of high-power turbo shaft machines or on very high speed test bench installations for turbo shaft machines.

I claim:

1. A gear transmission for transmitting power from an inlet drive shaft to an outlet driven shaft, said transmission comprising; 2 N gear wheels meshing in N gear trains, each of which is arranged to transmit one Nth of the power to be transmitted, the improvement comprising a shaft coupling between each adjacent pair of gear wheels on the same shaft via one of 2 N-2 torsion shafts.

2. A gear transmission according to claim 1 wherein four gear wheels mesh in two gear trains and are connected together in pairs by two torsion shafts.

3. A gear transmission according to claim 2 wherein the rigidities of the torsion shafts are proportional to the squares of the designed operating rotation speeds of the torsion shafts.

4. A gear transmission according to claim 1 wherein at least one of the torsion shafts is disposed inside one of the gear wheels which it couples together.

5. A gear transmission according to claim 2, wherein at least one of the torsion shafts is disposed inside one of the gear wheels which it couples together.

6. A gear transmission according to claim 3, wherein at least one of the torsion shafts is disposed inside one of the gear wheels which it couples together.

7. A gear transmission according to claim 3, wherein at least one of the torsion shafts is disposed inside one of the gear wheels which it couples together.

* * * * *